March 27, 1945.  B. F. CONNER  2,372,177
ARTICLE OF MANUFACTURE AND METHOD OF MAKING THE SAME
Filed Jan. 5, 1942   5 Sheets-Sheet 1
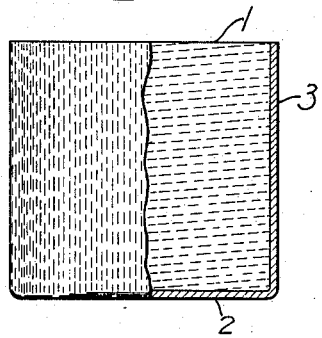
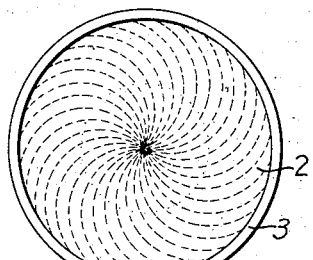
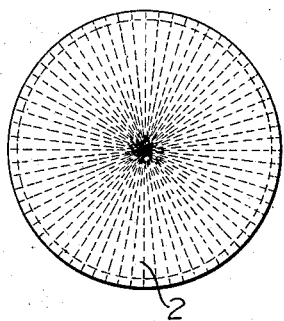
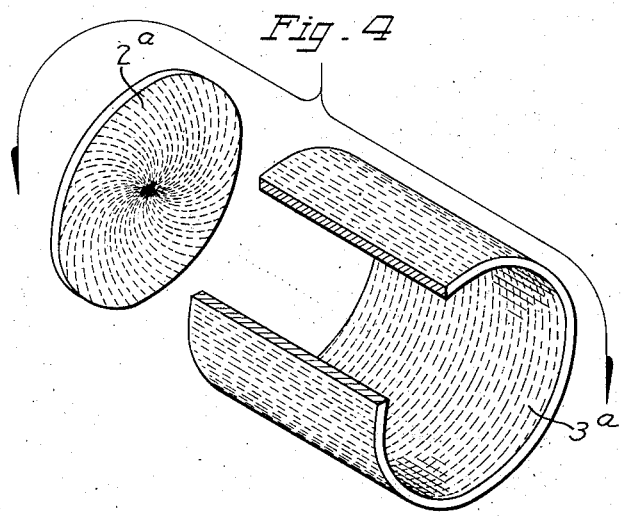
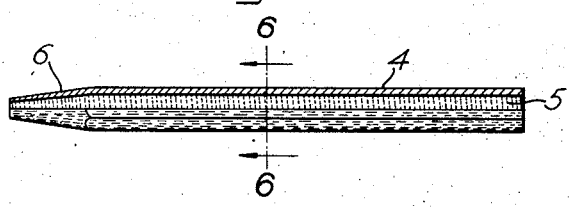
Inventor
Benjamin F. Conner
By S. Jay Teller
Attorney

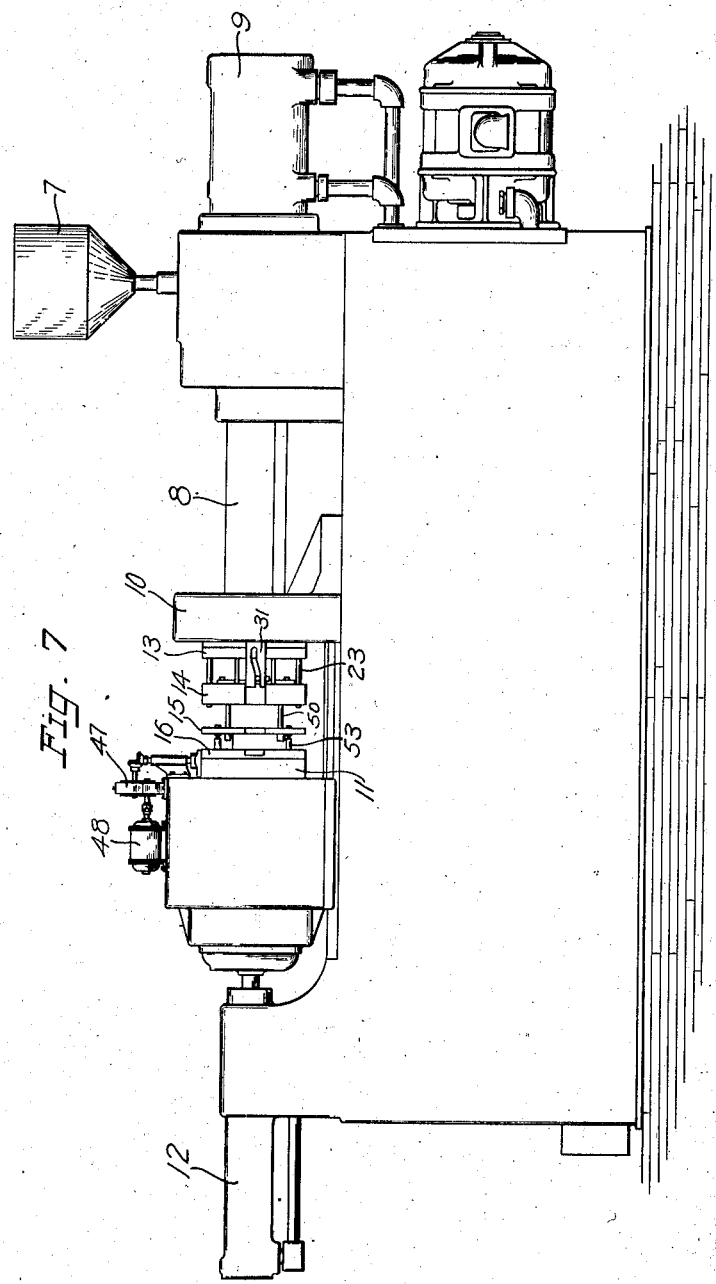

March 27, 1945. B. F. CONNER 2,372,177
ARTICLE OF MANUFACTURE AND METHOD OF MAKING THE SAME
Filed Jan. 5, 1942 5 Sheets-Sheet 3

Inventor
Benjamin F. Conner
By S. Jay Teller
Attorney

March 27, 1945. B. F. CONNER 2,372,177
ARTICLE OF MANUFACTURE AND METHOD OF MAKING THE SAME
Filed Jan. 5, 1942 5 Sheets-Sheet 4
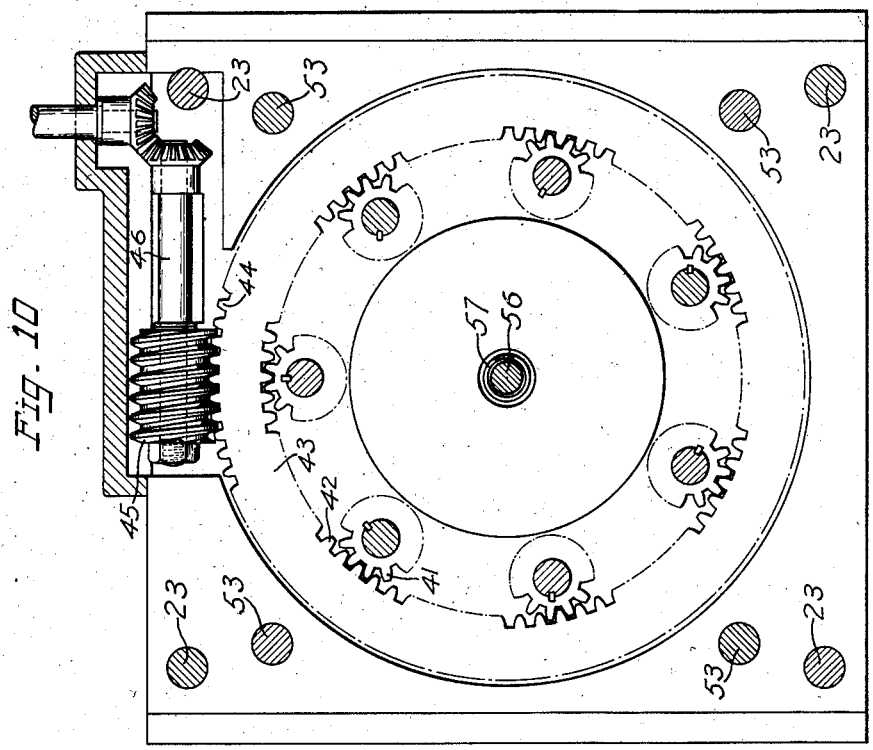
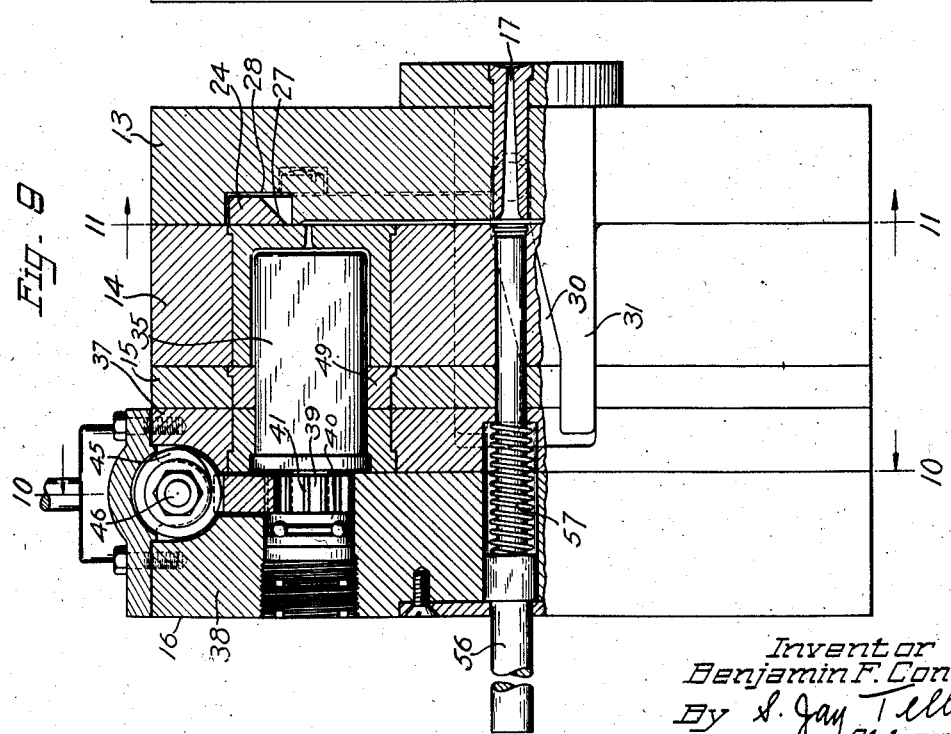
Inventor
Benjamin F. Conner
By S. Jay Teller
Attorney March 27, 1945.  B. F. CONNER  2,372,177
ARTICLE OF MANUFACTURE AND METHOD OF MAKING THE SAME
Filed Jan. 5, 1942  5 Sheets-Sheet 5

Inventor
Benjamin F. Conner
By A. Jay Teller
Attorney

Patented Mar. 27, 1945

2,372,177

UNITED STATES PATENT OFFICE 2,372,177

ARTICLE OF MANUFACTURE AND METHOD OF MAKING THE SAME

Benjamin F. Conner, West Hartford, Conn., assignor to Colt's Patent Fire Arms Manufacturing Company, Hartford, Conn., a corporation of Connecticut Application January 5, 1942, Serial No. 425,674

9 Claims. (Cl. 18—55)

The invention relates to the manufacture of articles formed of materials exhibiting grain characteristics, that is, materials which in their finished state show weakness along lines extending in one direction and have a relatively much greater strength along lines extending transversely to the said lines of weakness. As used hereinafter the phrase "effective grain direction" means the direction of the lines of weakness of materials exhibiting grain characteristics.

The primary object of the invention is to provide articles made from a material exhibiting grain characteristics that are of integral construction and have the effective grain direction of the material at and adjacent a surface thereof disposed angularly with respect to the effective grain direction of the material spaced from said surface.

Another object is to provide cup-shaped, tubular and sheet-like articles of the above character.

A further object is to provide a method of making articles of the above character.

Still further and other objects and advantages of the invention will be apparent from the following specification to those skilled in the art.

In the accompanying drawings I have shown several embodiments of the invention, but it will be understood that the drawings are intended for illustrative purposes only and are not to be construed as defining or limiting the scope of the invention, the claims forming a part of this specification being relied upon for that purpose.

In the drawings:

Fig. 1 is an elevational view of an article incorporating the invention, a portion being broken away to illustrate certain features thereof.

Figs. 2 and 3 are, respectively, top and bottom plan views of the article shown in Fig. 1.

Fig. 4 is a perspective view of the article of Fig. 1 illustrating different articles made therefrom.

Fig. 5 is an elevational view, partly in section, of a pencil barrel incorporating the invention.

Fig. 6 is a sectional view taken on the line 6—6 of Fig. 5.

Fig. 7 is a side elevational view of a molding machine for carrying out the process of the invention.

Fig. 9 is a side view partly in section of the mold shown in Fig. 8, the mold being shown in closed position.

Fig. 10 is a sectional view taken on the line 10—10 of Fig. 9.

Figure 8:
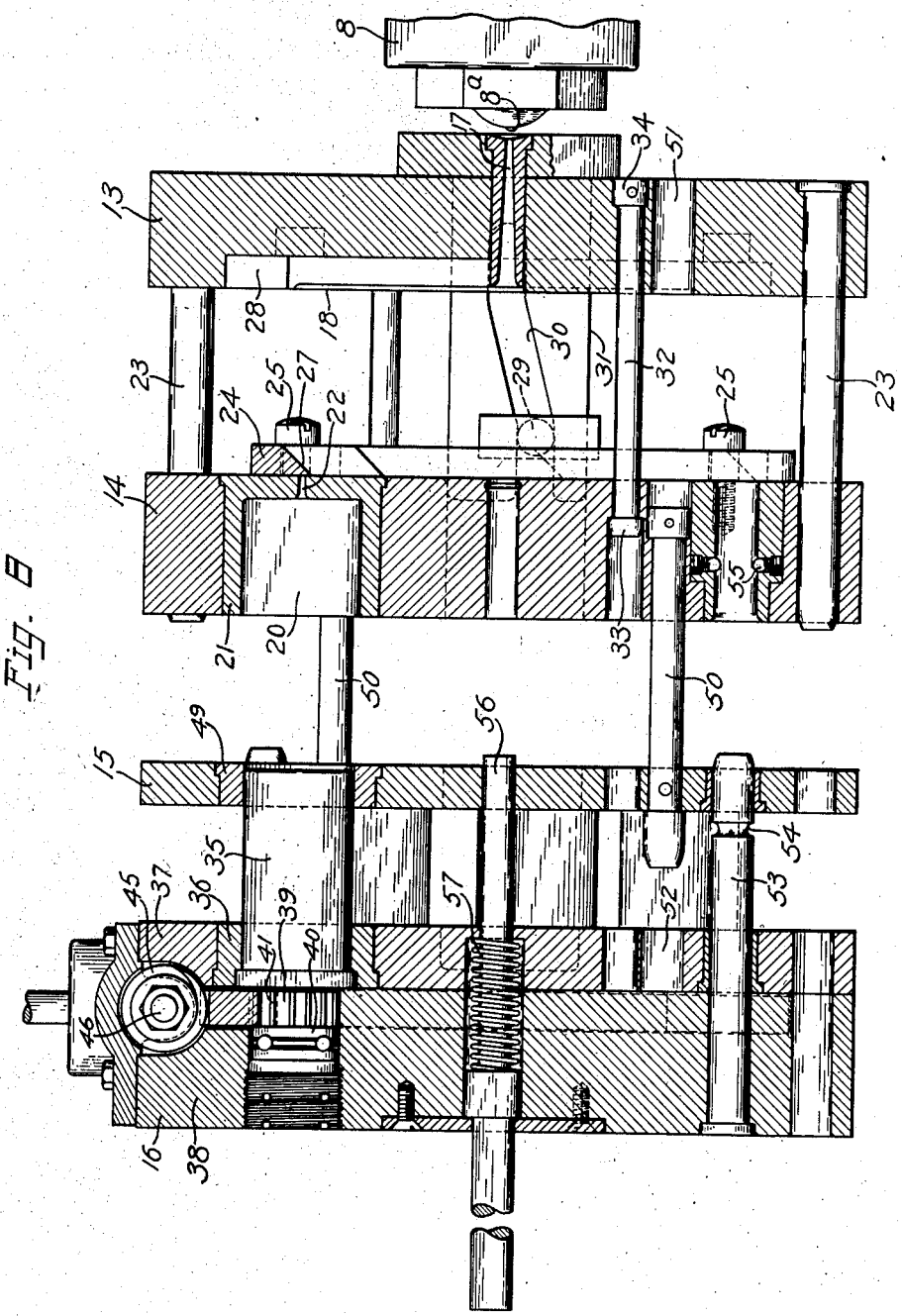
Fig. 8 is an enlarged sectional view taken on the line 8—8 of Fig. 11 but showing the mold in fully opened position.
Figure 12:
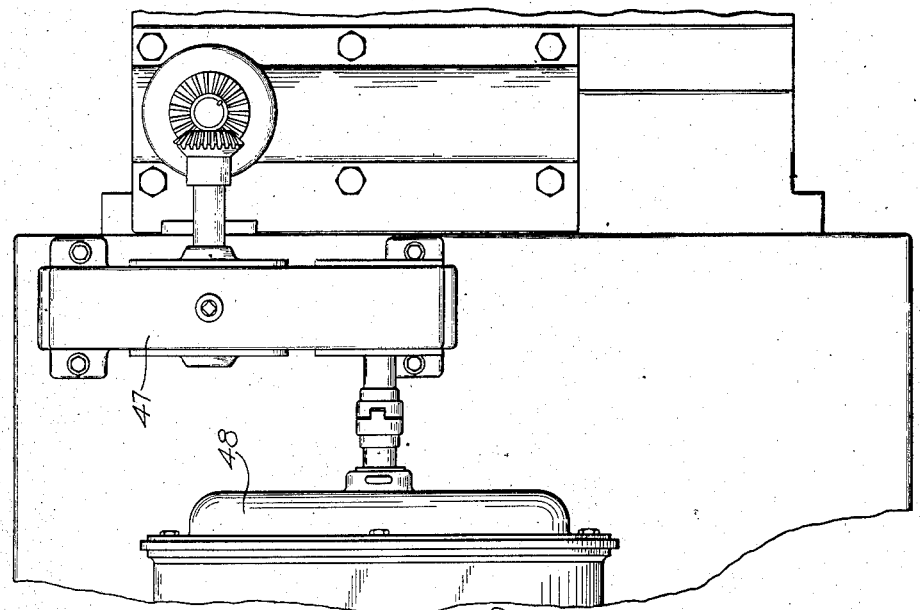
Fig. 12 is a fragmentary top plan view of a portion of the molding machine and mold shown in Fig. 7.
Figure 11:
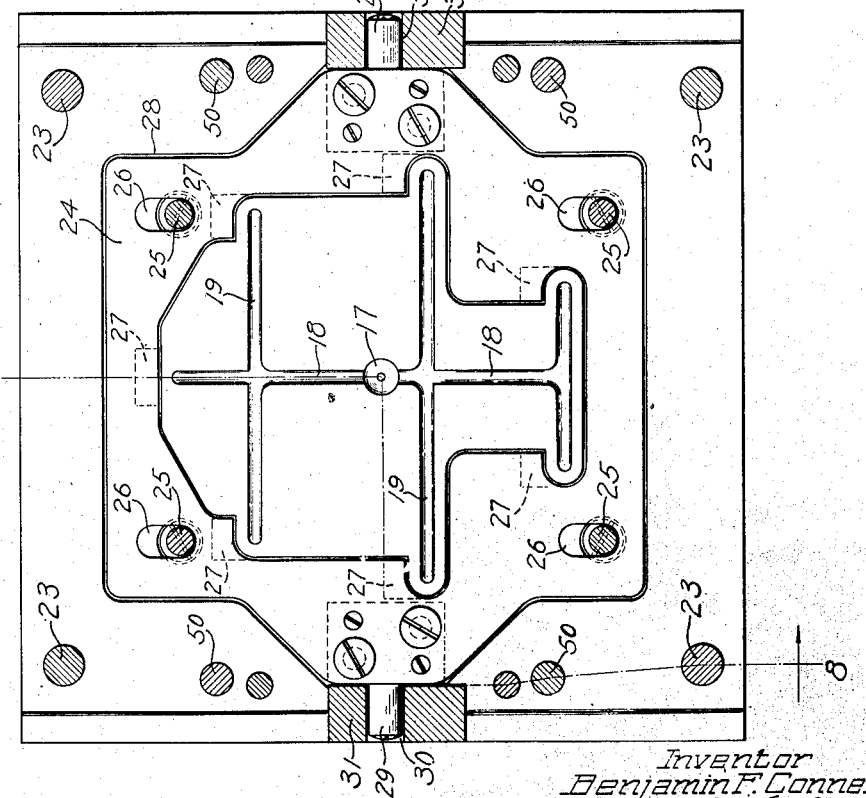
Fig. 11 is a sectional view taken on the line 11—11 of Fig. 9.

As above pointed out, the invention relates to the manufacture of articles from materials exhibiting grain characteristics. Among such materials and those to which the invention more particularly relates, but without limitation thereto, are cellulose acetate and the so-called synthetic resins such as, for example, phenol-formaldehyde, urea-formaldehyde, polystyrene and methyl methacrylate. The said materials to which the invention more particularly relates are hereinafter designated as "resinous materials."

Referring to Figs. 1, 2 and 3, there is shown an integral cup-shaped article 1 having a circular bottom 2 and a cylindrical sidewall 3, the walls of the article being of relatively thin section and the sidewall 3 being a surface of revolution. The article 1 is formed of a material exhibiting grain characteristics and has the effective grain direction thereof indicated by the direction of the dash lines. In Fig. 1 it is shown that the material at and adjacent the inner surface of the cylindrical portion 3 has an effective grain direction extending helically thereof and that the outer or opposed surface has an effective grain direction extending longitudinally thereof. In Figs. 2 and 3 it is shown that the effective grain direction of the inner bottom surface of the article 1 extends spirally while the effective grain direction of the outer bottom surface extends radially. It will be apparent that an article made as described so as to have the effective grain direction of the material at and adjacent one surface thereof extending angularly with respect to the effective grain direction of the material spaced from said surface will not be considerably weaker in one direction than in another as different integral portions thereof have their lines of weakness running in different directions. This construction gives rise to what is in effect a laminated construction, although, of course, the article is of integral construction rather than composed of a plurality of separate laminations.

Referring now to Fig. 4, there is shown a sheet-like article 2ª and a cylindrical tubular article 3ª. As indicated in this figure, the effective grain direction of the material at and adjacent one surface of each article extends angularly with respect to the material spaced from that surface.

The article shown in this figure may be made by cutting the bottom 2 from the cup-shaped article 1 shown in Figs. 1, 2 and 3.

Figs. 5 and 6 show a conventionally shaped tubular article 4 such as is used as a barrel for mechanical pencils. The pencil barrel comprises a portion 5 of uniform section and a tapered end 6. It will be noted that the inner surface of the barrel is a surface of revolution while the outer surface may be of any desired shape, a hexagonal cross section being shown. The pencil barrel is formed from a material exhibiting grain characteristics and has the effective grain direction of the material at and adjacent the inner surface extending helically of the barrel while the effective grain direction of the material at and adjacent the outer or opposed surface extends longitudinally of the barrel.

In accordance with the invention, articles incorporating the principles thereof, for example, articles such as above described, are made by processing one of the surfaces of the article so as to dispose the effective grain direction of the material at and adjacent that surface angularly with respect to the material spaced therefrom, and more particularly is this done in the case of materials which are shaped while in a plastic condition as these materials have their lines of weakness extending in the direction of flow of the material while in the plastic state. With specific reference to resinous materials which are commonly shaped into integral articles by being flowed within a shaped mold, the processing of one surface to angularly dispose the effective grain direction of the material at and adjacent that surface is accomplished by moving one mold part relatively to the other while the material of the article is in a plastic condition within the mold. The relative movement of the mold parts may be effected while the plastic material is flowing within the mold or after the flow thereof has ceased but while the material still is plastic, although at present the former method is considered preferable. In the case of articles having at least one surface of revolution, the relative movement of the mold parts may be readily accomplished by merely rotating the part adapted to form the surface of revolution.

For the purpose of more fully describing the method of making articles incorporating the principles of the invention, there is shown in Figs. 7–12 a molding machine including a mold adapted to make the cup-shaped article of Fig. 1. The machine illustrated is primarily adapted and intended for the forming of shaped articles of resinous materials of the type known as thermoplastics, that is, resinous materials which may be repeatedly plasticized by reheating. It should, however, be understood that the basic principles of the method are equally applicable to making articles embodying the invention from other materials exhibiting grain characteristics, including resinous materials of the thermo-setting type, that is, resinous materials which become permanently set and cannot be replasticized once they have been heated to the critical temperature and held there for the curing period of the material.

An injection molding machine of well-known design is shown in Fig. 7. The machine comprises a hopper 7, a material heating chamber 8, a hydraulic piston and cylinder 9 for propelling the molding material through the heating chamber and injecting it into the mold, a semi-stationary platen 10 for supporting a section of the mold, a movable platen 11 for supporting another section of the mold, and a second hydraulic piston and cylinder 12 for reciprocating the movable platen.

Reference is now made to Figs. 8–12 which illustrate in detail the special mold construction embodied in the machine of Fig. 7, and more particularly is reference made to Fig. 8 which is an enlarged cross-sectioned view of the mold in open position. The mold comprises the several sections 13, 14, 15 and 16. Section 13 is adapted to be fixedly secured to the semi-stationary platen 10 and has a main injection gate 17 extending therethrough. One end of this gate is adapted to be engaged by the injection nozzle 8$^a$ of the heating chamber 8 and the other end communicates by means of secondary gates 18 formed in the face of the mold section with tertiary gates 19 which are also formed in the face of the mold section (see Fig. 11).

The mold section 14 has a plurality of impression cavities 20 formed therein. The cavities are properly shaped to form the exterior of the article to be molded and are preferably formed in inserts 21 mounted within the mold section. A gate 22 extends between each of the cavities and the face of the mold section and serves, when the mold is in closed position, to connect each cavity with one of the gates 19. The mold section is suitably supported for movement to and from engagement with the section 13, this preferably being accomplished by providing dowels 23 carried by the section 13 and upon which section 14 is slidable. It will be understood that the dowels also serve to properly position the two sections so that when the mold is closed the gates 22 are aligned with the gates 19.

For reasons to become hereinafter apparent, means are preferably provided for cutting the sprue at the points where the cavity gates 22 connect with the gates 19. The now preferred construction is illustrated and comprises a cutter plate 24 mounted on the face of mold section 14 by means of cap screws 25. The plate is movable from its noncutting or up position of Fig. 9 to its cutting or down position of Fig. 8 by reason of the slots 26 through which screws 25 pass. The cutter plate has knife edges 27 formed thereon at the points where it cuts the sprue (Figs. 8 and 11) and is of a shape to surround the gating system. When the mold is closed the cutter plate is in raised position and is received in a suitably contoured recess 28 in mold section 13 (Fig. 9). Movement of the cutter plate may be effected as desired, as for example, by cam followers 29 sliding in cam grooves 30 in plates 31 attached to mold section 13. The grooves are shaped so as to time the movement of the cutter plate with the opening and closing of the mold.

In operation it is necessary to allow sufficient separative movement of mold sections 13 and 14 to allow the main gate sprue to be withdrawn from the main gate 17, but further separation is not desirable as it would obviously increase the bending moment on the dowels 23. Dowels 32 set in section 13 and extending in section 14 function, by means of the enlarged heads 33 and 34 thereon, to limit the separative movement to the optimum amount.

Mold section 16 is bolted or otherwise suitably secured to the movable platen 11 of the injection machine in proper alignment with the sections 13 and 14. The section carries a plurality of mold parts 35 receivable, when the mold is closed, within the cavities 20 to form the interior surface of the article being molded.

As previously pointed out, the integral lamination of the material of articles incorporating the invention is accomplished by moving one mold part angularly with respect to and during the flow of the material when plastic. In the mold construction illustrated provision is made for so moving the mold parts 35, each being rotatably mounted within journals 36 in plate 37, the latter together with plate 38 forming the main body of the section 16. A projection 39 on each part 35 engages with a thrust bearing 40 suitably mounted in plate 38. The projections 39 are provided with gear teeth 41 which engage with internal teeth 42 on a ring gear 43 (see Fig. 10). External teeth 44 on the ring gear are engaged with a worm gear 45 carried by shaft 46 suitably journaled in the mold section. The shaft is adapted to be rotated through proper gearing, including a speed reduction box 47, by a motor 48 suitably mounted on the movable platen.

The mold section 15 functions as a stripper plate and is provided with a plurality of apertures through which the mold parts 35 extend. The apertures are preferably formed in inserts 49 of bearing material in which the parts 35 are journaled. The stripper plate is supported between the mold sections 14 and 16 by means of dowels 50 as is apparent in Fig. 8. Dowels 50 are of the separative movement limiting type and restrict, by means of their headed ends, separative movement of the mold section 14 and the stripper plate to the amount necessary to allow removal of the articles being molded from between section 14 and the stripper plate. Mold sections 13 and 16 are appropriately recessed at 51 and 52 to accommodate the ends of dowels 50 when the mold is closed.

Dowel pins 53 are fixedly mounted in section 16 and project toward section 14 through suitable apertures in the stripper plate. The function of the dowels is to effect the proper sequential separation of the mold sections and to this end are provided with grooves 54 in which spring detents 55 in section 14 engage when the mold is closed.

The mold includes a knock-out pin 56 of usual construction and operation. The pin is carried by section 16 and projects, when the mold is closed, through the stripper plate and into section 14 and it is axially aligned with main gate 17. The pin is biased to retracted position by a spring 57. It will be understood that the pin is movable to projected position at the proper time during the cycle of operation by the usual means (not shown) usually provided therefor in injection machines.

By way of example, one specific method of forming an article of a material exhibiting grain characteristics and incorporating the principles of the invention will now be described with reference to the apparatus above detailed.

Assuming that the molding machine is ready to be put in operation, that is, hopper 7 is filled with a molding material such as polystyrene and heating chamber 8 is charged with molding material in the proper plastic condition, the molding operation is initiated. First movable platen 11 moves toward the semi-stationary platen 10 to close the mold and push it, together with the semi-stationary platen, to the right (as viewed in Fig. 7) into a position in which injection nozzle 8ª is seated against the entrance to main gate 17. The piston in cylinder 9 then advances into the heating chamber to expel a shot of plastic material therefrom. As the piston begins to move it actuates a switch (not shown) controlling the circuit of motor 48 which as it rotates causes rotation of ring gear 43 and, consequently, rotation of the mold parts 35.

The material expelled from the heating chamber flows through gates 17, 18, 19 and 22 into the cavities 20. When the material strikes the bottom of mold parts 35 it tends to flow radially outward to form the bottoms of the cups and then longitudinally of the cavities to form the sides of the cups. Most of the material, and more particularly that adjacent the outer surface of the cups being formed, does flow in the lines just described. However, the material at and adjacent the inner surfaces of the cups is caused to flow spirally in the cup bottoms and helically in the cup side walls due to the combination of the force of injection and the rotating frictional force of the rotating mold parts 35. It will be understood that the optimum speed of rotation of the mold parts 35 in relation to the linear speed of flow of the molding material within the mold cavities will be dependent upon several variables including the kind of molding material, its degree of plasticity, the shape and wall thickness of the article being molded, and the degree of angularity desired between the effective grain directions of the material at and adjacent one surface and that at and adjacent the other surface.

When the piston has reached the end of its injection stroke it again operates the switch controlling the motor circuit to open the circuit and stop rotation of the mold parts 35. After the necessary interval to allow preliminary setting of the injected material, the piston returns to its original position thus releasing the pressure on the article being molded. Following another interval to allow the injected material to further set, movable platen 10 is retracted to open the mold. During the first stage of the retracting movement the semi-stationary platen 10 and the entire mold, still in closed position, move leftward (as viewed in Fig. 7) with the movable platen until platen 10 reaches the position shown in Fig. 7. At this point movement of mold section 13 stops but opening movement of the sections 14, 15 and 16 continues with these sections held in closed position by the engagement of spring detents 55 in the grooves 54 in dowels 53. When mold sections 13 and 14 have separated sufficiently for the cap screws 25 to clear mold section 13, the cutter plate starts its downward or cutting movement by reason of the movement of the cam followers 29 in the grooves 30. By the time the sections 13 and 14 have separated to the full extent allowed by the limiting dowels 32, the cutter plate has severed the sprue consisting of the molding material in the gates 17, 18 and 19 which, of course, was withdrawn from the gates in the usual manner as the mold sections separated. At any desired point during the further opening of the mold the knockout pin 56 is actuated in a known manner to separate the sprue from the section 14.

When the sections 13 and 14 have separated to the full extent allowed, further opening movement separates sections 14 and 15 but the sections 15 and 16 remain together, being so held by the molded cups which have become frozen, due to shrinkage, on the mold parts 35. When the sections 14 and 15 have separated to the extent allowed by the limiting dowels 50, further movement of the stripper plate is impossible and the molded cups are stripped from the mold parts 35 as they are pulled through the apertures in the stripper plate. The sprue formed in the gates 22 can be clipped from the bottoms of the cups and if sheets or tubes are desired, the bottoms may be cut from the cups as described in connection with Fig. 4.

After the cups have been stripped, the machine is ready to repeat the operation, it being understood that with a molding machine such as illustrated the sequential operation is automatically controlled in a known manner.

The above described method of forming tubes is satisfactory for relatively short lengths. However, the principles of the invention are equally applicable to the formation of long tubes. Long tubes are now formed, but without providing for relative angularity of the effective grain direction of different portions of their thickness, by extrusion in a well-known manner. By providing for rotation of one of the forming members, preferably the ring die, long lengths of tube may be made in which the effective grain direction of the material at and adjacent one surface is angularly disposed with respect to the effective grain direction of the material spaced from said surface.

In the foregoing and the appended claims, the term "surface of revolution" is used in its broad mathematical sense to define the shape of a surface conceived as formed by the rotation or revolution of a plane line or curve about a line in its plane as an axis. Similarly, the term "surface of a complete revolution," as used in some of the claims, means that the cross section of the article taken in a plane normal to the central axis thereof comprises a generally endless figure extending around said axis for a full 360°.

As used hereinabove and in the appended claims, the terms "flow" and "flows" are used to denote the movement of the plasticizable molding material while in the mold cavity from the entrance end to the other. Said terms are used in the customary sense generally recognized in the plastic molding art. In the preferred embodiment of the invention, but without limitation thereto, said "flow" of the plastic material is induced by pressure developed in the molding machine.

While a detailed description has been given of one method embodying the principles of the invention, many other embodiments within the scope of the invention will be apparent to those skilled in the art.

What I claim is:

1. An integral molded article having two opposed surfaces one of which is a surface of a complete revolution, said article being formed of a homogeneous resinous material exhibiting grain characteristics and having the effective grain direction of the material at and adjacent one of the opposed surfaces thereof disposed angularly with respect to the effective grain direction of the material at and adjacent the other opposed surface.

2. An integral molded cup-shaped article having two opposed surfaces and formed of a homogeneous resinous material exhibiting grain characteristics, the effective grain direction of the material at and adjacent one of the opposed surfaces being disposed angularly with respect to the effective grain direction of the material at and adjacent the other opposed surface.

3. An integral molded tubular article having inner and outer opposed surfaces and formed of a homogeneous resinous material exhibiting grain characteristics, the effective grain direction of the material at and adjacent one of the opposed surfaces being disposed angularly with respect to the effective grain direction of the material at and adjacent the other opposed surface.

4. The method of making a molded integral article having two opposed surfaces from a plasticizable homogeneous resinous material having grain characteristics which comprises causing the material to flow within a mold to produce a predetermined effective grain direction in the material at and adjacent one of the opposed surfaces due to the flowing of the material, and moving the mold part adapted to form the other opposed surface in a manner to dispose the effective grain direction of the material at and adjacent said second mentioned surface angularly with respect to said predetermined effective grain direction.

5. The method of making a molded integral article having two opposed surfaces, one of which is a surface of a complete revolution, from a plasticizable homogeneous resinous material having grain characteristics which comprises molding the article by causing the material to flow while plastic within a plural part mold in a direction parallel to the axis of revolution to produce grain characteristics at and adjacent one surface of said article due to the flowing of the material and also while the material is plastic rotating one of the mold parts which forms said surface of revolution of the article to dispose the effective grain direction of the material at and adjacent said surface angularly with respect to the effective grain direction of the material at and adjacent the other surface of the molded article.

6. The method of making a molded integral article having two opposed surfaces from a plasticizable homogeneous resinous material having grain characteristics, said method comprising causing the material to flow while plastic within a mold to produce a predetermined effective grain direction in the material at and adjacent one of the opposed surfaces, and while the material is plastic moving the mold part adapted to form the other opposed surface in a manner to dispose the effective grain direction of the material at and adjacent said second mentioned surface angularly with respect to said predetermined effective grain direction.

7. The method of making a molded integral article having two opposed surfaces from a plasticizable resinous material having grain characteristics, said method comprising molding the article by causing the material to flow while plastic within a mold in a direction to produce a predetermined effective grain direction in the material at and adjacent both of the opposed surfaces, and also while the material is plastic rotating the mold part which forms one surface of said article to change the effective grain direction of the article at and adjacent said surface to dispose said direction angularly to the effective grain direction of the material at and adjacent the other opposed surface.

8. The method of making a molded integral hollow article having two opposed surfaces, one of which is a surface of a complete revolution, from a plasticizable resinous material having grain characteristics, said method comprising molding the article by causing the material to flow while plastic within a mold in a direction to form said hollow article and produce a predetermined effective grain direction in the material at and adjacent both of the opposed surfaces, and also while the material is plastic rotating the mold part which forms one surface of said article to change the effective grain direction of the article at and adjacent said surface to dispose said direction angularly to the effective grain direction of the material at and adjacent the other opposed surface.

9. The method of making a molded integral cup-shaped article having two opposed surfaces from a plasticizable resinous material having grain characteristics, said method comprising molding the article by causing the material to flow while plastic within a mold in a direction to form the side portions and bottom of said cup-shaped article and produce a predetermined effective grain direction in the material at and adjacent both of the opposed surfaces, and also while the material is plastic rotating the mold part which forms one surface of said article to change the effective grain direction of the article at and adjacent said surface to dispose said direction angularly to the effective grain direction of the material at and adjacent the other opposed surface.

BENJAMIN F. CONNER.